Dec. 11, 1928.　　　　　　　　　　　　　　　　1,694,381
G. H. HARTMAN
APPARATUS FOR ELEVATING POPPED CORN AND DELIVERING IT
Original Filed Dec. 20, 1922　　2 Sheets-Sheet 2

INVENTOR
George H Hartman

Patented Dec. 11, 1928.

1,694,381

UNITED STATES PATENT OFFICE.

GEORGE H. HARTMAN, OF CLEVELAND, OHIO.

APPARATUS FOR ELEVATING POPPED CORN AND DELIVERING IT.

Application filed December 20, 1922, Serial No. 608,114. Renewed May 10, 1928.

This invention relates to a process for elevating popped corn, and delivering it in measured quantities, and in particular to delivering it in measured quantities, from a storage hopper.

An object of the invention is to provide a storage hopper for popped corn, from which the popped corn can be elevated and delivered in small measured amounts, without complicated mechanism.

Another object of the invention is to provide means to deliver popped corn in an economical, sanitary, and rapid manner, and under conditions which permit of its being heated just prior to delivery.

Another object of my invention is to utilize the inherent tendency in popped corn to maintain mass formation after being pressed into a confined space.

Another object of the invention is to provide in a storage hopper for popped corn, pressure elevating means, which means are so arranged, that the corn compressed incident to a delivery operation, will not be appreciably mashed or broken.

Further objects and advantages of the invention are apparent from the following detailed description.

While the invention in its broader aspect is capable of embodiment in different forms, a preferred embodiment thereof, and of the mechanism forming the same are illustrated in the accompanying drawings, in which,—

Figure 2:
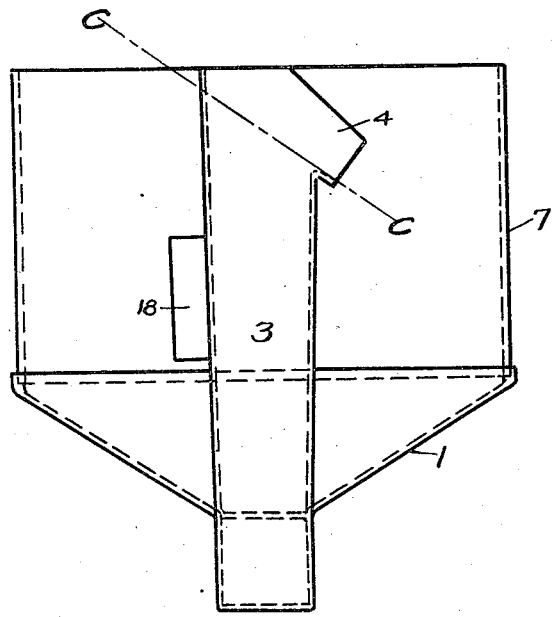
Figure 2 is an end view of the upper portion of the mechanism, along the line BB in Figure 1.
Figure 3:
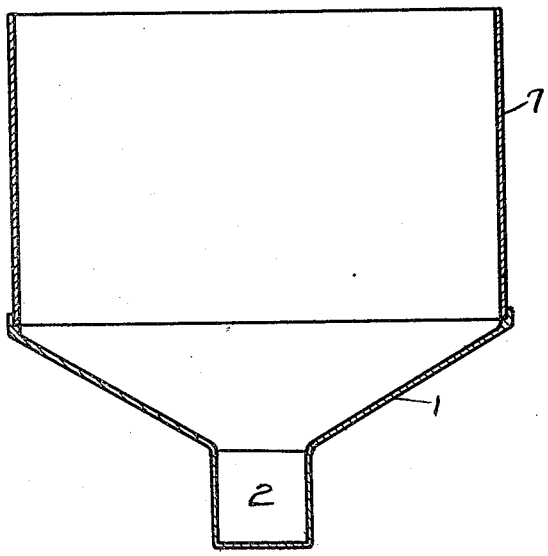
Figure 3 is a vertical cross section along the line AA in Figure 1.

Referring to the drawings, 1 designates a hopper, with its downwardly extending side walls, terminating in, and forming a rectangular measuring cup 2, and with a hollow tubular spout 3, extending upward from the measuring cup 2, and terminating in an outlet passage 4 (Fig. 2). The measuring cup 2, also has its side walls extended rearward, to form a guideway 5, into which a plunger 6, is mounted for longitudinal reciprocatory movement therewith. It is evident that popped corn disposed within the hopper 1, will fall by gravity into the measuring cup 2, and that upon a forward movement of the plunger 6, the corn therein disposed, will be pushed up, and into the spout 3. Movement is imparted to the plunger as is hereinafter described. Extending upward from the hopper 1, are the side walls 7, which serve to enlarge the capacity of the hopper, so that more popped corn may be held therein.

Figure 1:
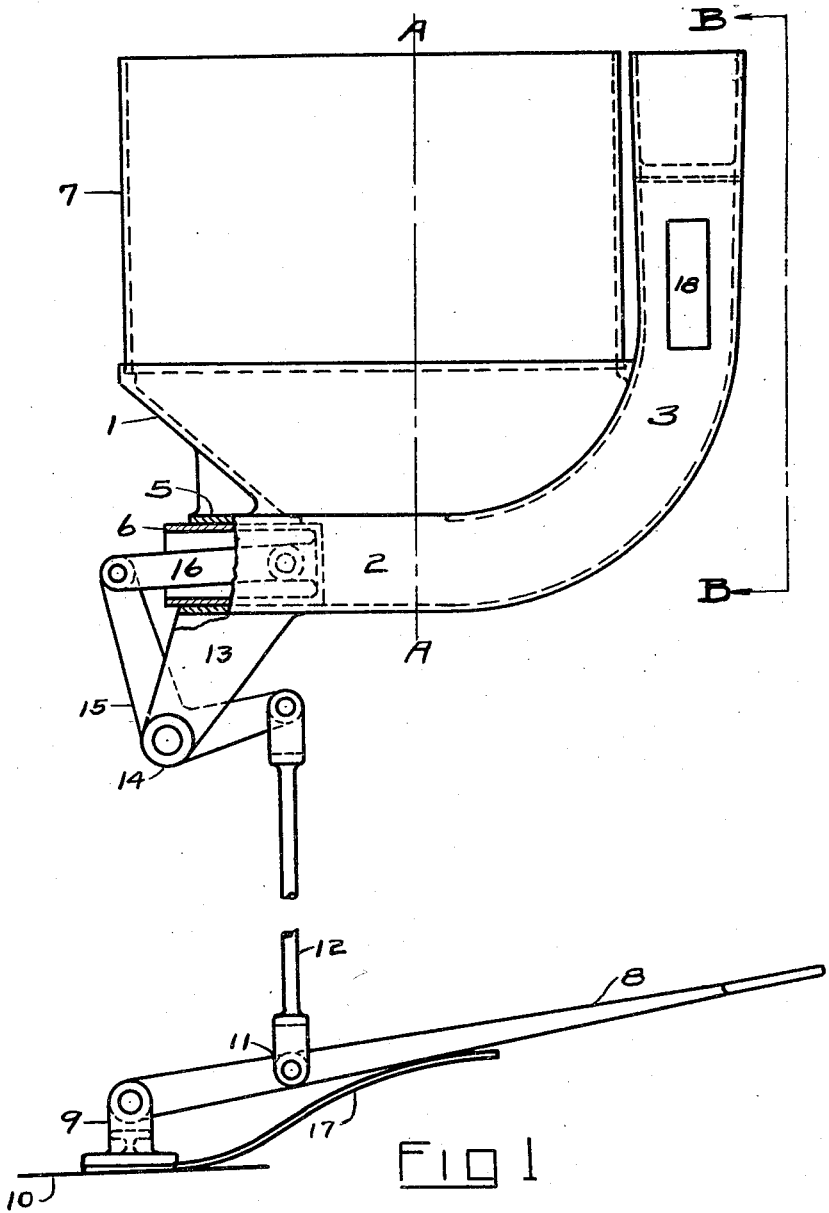
Figure 1 is an elevation of the mechanism, with parts broken away and in section.

As a means of imparting movement to the plunger, I have shown in the present instance, a foot lever 8, having one end mounted in a bracket 9, for rocking movement therewith. This bracket 9 is mounted in a fixed position onto any suitable location, indicated in the present instance by the line 10. Intermediate the two extremes of the lever at 11, is pivoted one end of a rod 12. Extending downward from the lower portion of the hopper 1, is a bracket arm 13, provided with a pivot boss 14, which is adapted to carry a bell crank 15, having rocking movements therewith. A link 16, connects the upwardly extending arm of the bell crank to the plunger 6. The other arm of the bell crank extends inward and is connected to the upper end of the rod 12. It is thus evident that a movement imparted to the foot lever 8, will produce longitudinal movement in the plunger 6, and that the amount of movement imparted to the foot lever will determine the amount of travel that will be imparted to the plunger. A flat spring 17 is provided in the present instance to return the foot lever to the normal starting position, as shown in Figure 1. It is evident that a downward movement imparted to the outer end of the foot lever will cause the plunger to move inward, thereby pushing the popped corn disposed internal of the measuring cup 2, up and into the spout 3. It is also evident that when the spout 3 has become filled with corn, that with each forward pushing movement of the plunger, substantially the same volume of popped corn will be forced out of the outlet passage 4, as is displaced by the longitudinal movement of the plunger, and that this volume will be variable and dependent upon the movement imparted to the plunger 6.

A heating element 18, which in the present instance is shown as electric, is mounted on one or more sides of the spout 3, and the popped corn is thereby warmed before it is discharged through the outlet passage 4. The electrical connections to this heater are not here shown or otherwise described, inasmuch as this is common construction, and forms no part of the present invention.

The operation of the mechanism is as follows:

Upon a pressing of the foot lever 8, the plunger 6 is caused to move inward, and popped corn disposed internal of the measuring cup 2 is pressed inward into the spout 3. Upon a releasing of the foot lever, the plunger will return to the position shown in Figure 1, and a quantity of popped corn will fall from the hopper 1, into the measuring cup. A duplication of this movement of the plunger will then force or pump additional corn from the hopper up and into the spout 3, until sufficient corn has been discharged thereunto, so as to cause the corn to spill over and out of the outlet passage 4. Between each delivery operation the corn will then lay substantially along its angle of repose in the top of the spout, which angle is indicated by the line CC in Figure 2.

It is evident that as the plunger 6 presses the popped corn into the spout 3, a sufficient resistance to serve the purpose of the process, will result from friction and deflection or bending of the mass confined in the spout, in the curved portion thereof. The maintenance of mass formation in the spout is due to two properties of popped corn, namely, its sponge like resiliency, and variety and irregularity of physical form. Materials devoid of this combination of properties would not maintain mass formation to a sufficient degree to insure reliable measurement of quantity, and dependability of operation for commercial vending. These properties of popped corn in connection with the process or method constituting my invention produce in effect for all purposes of practicing the process, the function of a check valve in preventing back flow which would have the effect of destroying accuracy and uniformity of measurement.

I wish it understood that the particular form of mechanism with which I have clothed my process, and the different parts thereof illustrated and described, are merely a typical method of carrying my process into effect, and that the specific construction described herein is merely by way of illustration and not by limitation or narrowing of my claims, as obviously, changes in construction and design can be made without departing from my invention, and such changes are contemplated by me, and would not involve any departure from my invention.

Having thus described my invention, what I claim as new, and desire to secure by Letters Patent, is:—

1. Apparatus for elevating successive charges of popped corn, consisting of a bent, upwardly extending tube, said tube having its side walls outwardly flaring so that the charges of corn when forced therein will remain in the varying levels to which they are forced.

2. Apparatus for elevating and delivering successive charges of popped corn consisting of an upwardly extending tube member, said member increasing in cross sectional area to point of delivery, so that charges of popped corn when forced therein will remain in the varying levels to which they are forced, up to the level of delivery.

In testimony whereof, I affix my signature.

GEORGE H. HARTMAN.